(12) United States Patent
Fukui et al.

(10) Patent No.: US 7,732,066 B2
(45) Date of Patent: Jun. 8, 2010

(54) SURFACE-COATED MACHINING TOOLS

(75) Inventors: Haruyo Fukui, Itami (JP); Tatsuro Fukuda, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 82 days.

(21) Appl. No.: 10/065,992

(22) Filed: Dec. 8, 2002

(65) Prior Publication Data
US 2003/0118412 A1    Jun. 26, 2003

(30) Foreign Application Priority Data
Dec. 26, 2001  (JP)  .............................. 2001-393164
Aug. 13, 2002  (JP)  .............................. 2002-235624

(51) Int. Cl.
*B23C 5/10*    (2006.01)
(52) U.S. Cl. .................... 428/698; 428/182; 428/325; 428/336; 428/408; 428/469; 51/307; 51/309
(58) Field of Classification Search ................ 428/408, 428/469, 182, 698, 336, 325; 51/307, 309
See application file for complete search history.

(56) References Cited

U.S. PATENT DOCUMENTS

| | | | | |
|---|---|---|---|---|
| 4,966,501 A | * | 10/1990 | Nomura et al. | ............ 407/119 |
| 5,009,705 A | * | 4/1991 | Yoshimura et al. | ............ 51/307 |
| 5,068,149 A | * | 11/1991 | Shimada et al. | ............ 428/367 |
| 5,071,693 A | * | 12/1991 | Sue et al. | .................... 428/699 |
| 5,075,181 A | * | 12/1991 | Quinto et al. | ............... 428/698 |
| 5,137,398 A | | 8/1992 | Omori et al. | |
| 5,185,211 A | * | 2/1993 | Sue et al. | .................... 428/472 |
| 5,266,388 A | * | 11/1993 | Santhanam et al. | ........ 407/119 |
| 5,288,676 A | * | 2/1994 | Shimada et al. | ............... 75/236 |
| 5,325,747 A | * | 7/1994 | Santhanam et al. | ........ 407/119 |
| 5,364,209 A | * | 11/1994 | Santhanam et al. | ........ 428/698 |
| 5,376,444 A | * | 12/1994 | Grotepass et al. | ........... 428/408 |
| 5,415,674 A | * | 5/1995 | Feistritzer et al. | ............. 51/293 |
| 5,482,602 A | * | 1/1996 | Cooper et al. | ............... 427/577 |
| 5,494,635 A | * | 2/1996 | Bennett | ....................... 419/58 |
| 5,543,210 A | * | 8/1996 | Kullander et al. | ........... 428/217 |
| 5,580,666 A | * | 12/1996 | Dubensky et al. | ........... 428/552 |

(Continued)

FOREIGN PATENT DOCUMENTS

JP    63-014869    *    1/1988

(Continued)

OTHER PUBLICATIONS

Hakovirta "Hardmetal woodcutting tool tips coated with tetrahedral amorpous carbon" Diamond Related Materials 8 (1999) p. 1225-1228.*

*Primary Examiner*—Archene Turner
(74) *Attorney, Agent, or Firm*—James W. Judge

(57) ABSTRACT

Surface-coated machining tools in particular utilized in routing, slitting and drilling processes on printed circuit boards onto which integrated circuits and various electronic parts are populated. A cemented-carbide base material containing tungsten carbide and cobalt, with the cobalt inclusion amount being 4 weight % or more and 12 weight % or less, is furnished. A compound thin film made up of a combination of one or more elements selected from the group titanium, chromium, vanadium, silicon and aluminum, and one or more selected from carbon and nitrogen, is coated over the cemented-carbide base material. The compound thin film is coated in at least a single layer.

10 Claims, 1 Drawing Sheet

U.S. PATENT DOCUMENTS

| | | | |
|---|---|---|---|
| 5,619,000 A * | 4/1997 | Ederyd et al. | 75/242 |
| 5,674,620 A * | 10/1997 | Puiia et al. | 428/408 |
| 5,718,948 A * | 2/1998 | Ederyd et al. | 428/552 |
| 5,733,668 A * | 3/1998 | Kameoka et al. | 428/698 |
| 5,763,087 A * | 6/1998 | Falabella | 428/408 |
| 5,773,735 A * | 6/1998 | Dubensky et al. | 75/240 |
| 5,776,588 A * | 7/1998 | Moriguchi et al. | 428/698 |
| 5,856,626 A * | 1/1999 | Fischer et al. | 75/242 |
| 5,942,318 A * | 8/1999 | Soderberg et al. | 428/698 |
| 5,952,102 A * | 9/1999 | Cutler | 428/408 |
| 6,007,909 A * | 12/1999 | Rolander et al. | 428/336 |
| 6,027,808 A * | 2/2000 | Aoki et al. | 428/408 |
| 6,071,469 A * | 6/2000 | Rohlin et al. | 419/14 |
| 6,086,980 A * | 7/2000 | Foster et al. | 428/212 |
| 6,139,964 A * | 10/2000 | Sathrum et al. | 428/408 |
| 6,183,818 B1 * | 2/2001 | Vohra et al. | 427/249.8 |
| 6,221,479 B1 * | 4/2001 | Waldenstrom et al. | 428/699 |
| 6,228,139 B1 * | 5/2001 | Oskarsson | 75/240 |
| 6,267,797 B1 * | 7/2001 | Ostlund et al. | 75/240 |
| 6,267,867 B1 * | 7/2001 | Olson | 205/640 |
| 6,268,045 B1 * | 7/2001 | Leyendecker et al. | 428/216 |
| 6,284,376 B1 * | 9/2001 | Takenouchi et al. | 428/408 |
| 6,344,265 B1 * | 2/2002 | Blomstedt et al. | 428/216 |
| 6,395,379 B1 * | 5/2002 | Braendle | 428/698 |
| 6,406,224 B1 * | 6/2002 | Ostlund et al. | 407/119 |
| 6,565,957 B2 * | 5/2003 | Nakamura et al. | 428/336 |
| 6,627,335 B2 * | 9/2003 | Kodama et al. | 51/309 |
| 6,723,389 B2 * | 4/2004 | Kobayashi et al. | 427/249.13 |
| 6,881,475 B2 * | 4/2005 | Ohtani et al. | 428/698 |
| 6,962,751 B2 * | 11/2005 | Fukui et al. | 428/408 |

FOREIGN PATENT DOCUMENTS

| | | | |
|---|---|---|---|
| JP | H02-022454 A | | 1/1990 |
| JP | 05-177412 | * | 7/1993 |
| JP | 05-285740 | * | 11/1993 |
| JP | 06-108253 | * | 4/1994 |
| JP | H07-188901 A | | 7/1995 |
| JP | H08-092685 A | | 4/1996 |
| JP | H10-138027 A | | 5/1998 |
| JP | 3065547 B2 | | 5/2000 |
| JP | 2000-308905 A | | 11/2000 |
| JP | 2000-336451 A | | 12/2000 |
| JP | 2001-062605 | * | 3/2001 |
| JP | 2001-234328 A | | 8/2001 |

* cited by examiner

SURFACE-COATED MACHINING TOOLS

BACKGROUND OF INVENTION

1. Field of the Invention

The present invention relates generally to surface-coated machining tools, and more specifically to surface-coated machining tools employed in routing, slitting, drilling, and like processes on printed circuit boards onto which integrated circuits and various electronic parts are populated.

2. Description of the Background Art

In processing the peripheral form of circuit boards, press-working has been largely employed to date. Because printed circuit boards are structured by sandwiching copper foil into epoxy resin incorporating glass fiber, however, particulate matter produced when press-working has been a problem in the working environment. Therein, a machining tool referred to as a "router cutter," with which slitting and routing processes are carried out on printed circuit boards, is used. An advantage to a milling machine employing the router cutter is that since the work is carried out while the cut end is under suction, there is no risk that chips will scatter externally.

Meanwhile, the tasks of miniaturizing electronic devices and making them lightweight have become a must in recent years, and owing to demands for heightening the density and precision in how components populate printed circuit boards—which are pivotal to actual operation—the dimension of the slots formed by routing is being made smaller and smaller, and correspondingly the diameter of the router cutter has come to be 3.175 mm or less.

Likewise, with the number of boards in a printed-circuit-board stack processed at once having increased and the processing speed gone up in order to improve working performance and reduce manufacturing costs, a consequent problem has been that router cutters have turned out to be inadequate in strength, breaking during jobs and producing burrs on printed circuit boards, rendering them unusable.

The router cutter presented in Japanese Pat. No. 3065547, for example, addresses this situation by furnishing a reinforcing rib on the chisel-face side of the router-cutter bit, enhancing the rigidity of the bit and improving the router cutter strength that had been a problem conventionally, to serve as a remedy against breakage accidents during machining jobs.

Meanwhile, in forming small-diameter holes in printed circuit boards given advances in heightening the density of and in laminating the printed circuit boards, machining tools referred to as miniature-drills are being widely used for PCB (printed circuit board) processing. Likewise, owing to calls for heightened density and precision in how components populate printed circuit boards, the holes formed in them by PCB-processing miniature-drills have become more and more micro-dimensioned, in accordance with which the diameter of the PCB-processing miniature-drills has come to be 0.3 mm or less. In order to improve working efficiency and reduce manufacturing costs, furthermore, processing speeds have accelerated; and given the circumstances, a consequent problem has been that PCB-processing miniature-drills have turned out to be inadequate in strength, breaking during jobs and producing burrs on printed circuit boards, which has been a cause of defective products.

In Japanese Pub. Pat. App. No. 10-138027, for example, this situation is addressed by utilizing a cemented carbide as the material for the PCB-processing miniature-drill presented therein, and by coating the surface with a hard carbon film deposited employing a hydrocarbon gas (methane), to improve resistance to, and serve as a remedy against, breakage.

Nevertheless, with demands from users for heightening the component surface-mounting density and precision growing more and more intense, the diameter of the router cutter that performs routing and slitting processes has come to be 1.6 mm or less—half what had been conventional—and preventing breakage defects during processing has turned out to be difficult merely by the above-described improvement in tool form.

By the same token, accompanying the growing intensity in demands for heightening the component surface-mounting density and precision has been the utilization of PCB-processing miniature-drills 0.2 mm or less in diameter to perform the drilling processes; but drills that perform adequately have not been obtainable with the above-described hard carbon film deposited using a hydrocarbon gas, in that the film hardness is low because hydrogen gets mixed into the film.

SUMMARY OF INVENTION

An object of the present invention, which has come about in order to resolve problems as noted above, is to provide machining tools—in particular, machining tools utilized in routing, slitting and drilling processes on printed circuit boards onto which integrated circuits and various electronic parts are populated—whose fracturing resistance and durability are enhanced by coating the tool surface with a coating film to heighten the blade-portion rigidity and make the chip-discharging ability better.

A surface-coated machining tool in accordance with certain aspects of the invention is furnished with a cemented-carbide base material containing tungsten carbide and cobalt, with the cobalt inclusion amount being 4 weight % or more and 12 weight % or less. Over the cemented-carbide base material, a compound thin film made up of a combination of one or more elements selected from the group titanium, chromium, vanadium, silicon and aluminum, and one or more elements selected from carbon and nitrogen, is coated. The compound thin film is coated in at least a single layer.

A surface-coated machining tool in accordance with certain other aspects of the invention is furnished with a cemented-carbide base material containing tungsten carbide and cobalt, with the cobalt inclusion amount being 4 weight % or more and 12 weight % or less. Over the cemented-carbide base material, a hard carbon thin film, made up essentially of carbon atoms only, is coated by a physical vapor deposition method in which graphite is made a raw material. The hard carbon thin film is coated in at least a single layer.

As given by a more preferable embodiment of the invention, the above-noted compound thin film and hard carbon thin film are respectively 0.05 µm or more, 3 µm or less in thickness.

As given by a more preferable embodiment, the invention is characterized in that a compressive residual stress of 0.1 GPa or more, 8 GPa or less is imparted to the above-noted compound thin film and hard carbon thin film.

As given by a more preferable embodiment, the invention is characterized in that the surface roughness of the above-noted compound thin film and hard carbon thin film is adjusted to be 0.01 µm or more, 0.5 µm or less by indication Ra (surface roughness).

As given by a more preferable embodiment, the invention is characterized in that the pre-sintering crystal-grain size of the tungsten carbide in the above-noted cemented-carbide base material is 0.1 µm or more, 1.5 µm or less.

From the following detailed description in conjunction with the accompanying drawings, the foregoing and other objects, features, aspects and advantages of the present invention will become readily apparent to those skilled in the art.

DETAILED DESCRIPTION

Figure 1A:
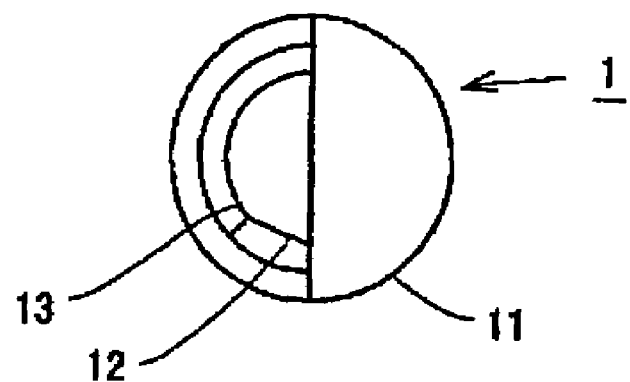
FIG. 1A is a plan view illustrating the structure of a surface-coated machining tool (router cutter) in embodiments based on the present invention.

Surface-coated machining tools in several embodiments based on this invention will be explained in the following.

WC-based cemented carbide utilized as the base material for surface-coated machining tools in embodiments of the present invention incorporates 4 to 12 weight % cobalt, and the average particle diameter of the tungsten carbide is within a 0.1 to 1.5 μm range.

The cobalt is incorporated in particular for forming a bonding layer; less than 4 weight % would be undesirable because the toughness deteriorates and nicks arise in the cutting edge. Conversely, if in excess of 12 weight % is incorporated, the hardness of the base material deteriorates, degrading the resistance to wear during high-speed cutting; at the same time, the adhesiveness deteriorates remarkably—owing to low affinity—between the cobalt, and the compound thin film and the hard-carbon thin film, because in situations in which a powerful external force is applied to the cutting edge, the highly hard thin films cannot follow the deformation in the base material, and the thin films end up peeling away from their interface with the carbide base material.

TaC, VaC and the like, effective in checking WC grain growth and effective in enhancing cutting-edge strength, may also be incorporated into the carbide base material.

Moreover, should the average crystal-grain size of the WC be 0.1 μm or less, distinguishing the grain size by evaluation methods at present would be challenging; and an average crystal-grain size of 1.5 μm or more would be undesirable because if the film were abraded, large WC particles within the base material would drop out, giving rise to significant fracturing. The grain size of the WC has an extreme impact on the toughness of the base material, and taking results of evaluating adhesiveness of the compound thin film and the hard carbon thin film into consideration, it is preferable that the average WC grain size be 0.1 to 1.5 μm.

Herein, a compound thin film or a hard carbon thin film is coated onto the base material noted above. The compound thin film is composed by combining one or more elements selected from the group titanium, chromium, vanadium, silicon and aluminum, and one or more of the elements carbon and nitrogen. Inasmuch as the exceeding strength and high anti-oxidization properties of this compound thin film enable improved anti-wear properties and prolonged machining-tool life, and at the same time compared to a WC surface, thermal and chemical reactions with the workpiece are restrained, the chip-discharging faculty is made better. In addition, since weld-adhesion of the workpiece is controlled, the machining resistance is lowered, and breakage of the cutting blade is suppressed.

Furthermore, although as hard carbon thin films are those referred to as "amorphous C films," "amorphous carbon films," "diamond-like carbon films," "DLC films," and "a-C: H, i-carbon films," in the present embodiment the hard carbon thin film for machining tools is, in order that superior wear resistance be exhibited and to obtain a high degree of hardness that rivals that of diamond, composed of carbon atoms only, except for impurities that unavoidably become included during film deposition, through a situation in which, by utilizing a physical vapor deposition method making graphite the starting material, reaction gas is deliberately not introduced. In this case a structure closer to a diamond structure than are so-called hydrogen-containing hard carbon thin films is produced, and at the same time the hardness is heightened, the anti-oxidation characteristics are improved to near equivalence with diamond, at an approximate 600° C.

While there are numerous publicly known techniques for coating with a hard carbon thin film, especially among physical vapor deposition methods in which graphite is made the starting material, with the deposition speed being rapid, preferable are for example cathodic arc deposition, laser ablation, and sputtering, which are generally employed industrially.

In terms of coating-film adhesive power and film hardness, film deposition by cathodic arc deposition is preferable. With cathodic arc deposition tool lifespan can be greatly improved, because the ionized proportion in the raw material is high; because the hard carbon thin film is formed by irradiating chiefly carbon ions onto the base material; and because, with the sp3-crystal ratio being high, dense films are obtained and the hardness is heightened.

Likewise, the fact that hard carbon thin films have a low coefficient of friction makes their chip-discharging faculty better compared to a WC surface; in addition, the fact that weld-adhesion of the workpiece is curbed lowers the machining resistance and meanwhile suppresses cutting-edge breakage.

Compound thin films and hard carbon thin films deposited as by the present embodiment are formed such that the surface roughness thereof, by JIS-code indication Ra, will be 0.01 μm or more, 0.5 μm or less. In this respect, when looked at for machining tools, although from the viewpoint of chip-discharging faculty and machining resistance it is desirable that the films' surface roughness Ra be as small as possible, that it be 0 is not possible in actuality; and therefore as a result of conducting various machining tests it was discovered that wherein the Ra was 0.5 μm or less, the chip-discharging faculty improved, as did the machinability.

Likewise, the coating was formed so as to have a film thickness of 0.05 μm to 3 μm, and the reason for this was that at less than 0.05 μm, there were problems with the anti-wear properties, and in excess of 3 μm there were problems in that internal stress accumulating in the coating would grow large, making it prone to peeing off and producing chips in the coating. More preferable is a film thickness of 0.05 to 1.5 μm. By the same token, making the film thickness 3 μm or under was effective in lessening the size and density of macroparticles arising on the film surface, and in controlling the surface roughness to be 0.05 μm or under by the above-noted indication Ra.

In the present embodiment, a residual stress is imparted so as to be a compressive pressure of 0.1 GPa or more, 8 GPa or less on the compound thin films and hard carbon thin films. Imparting a compressive residual stress on the cemented-carbide base material remarkably remedies the breakage tendency of router cutters and drills. Herein, if the compressive residual stress is 0.1 GPa or less, there is no noticeable improvement in fracturing resistance, and if 8 GPa or more, owing to the film's stress rating being high, the film becomes prone to peeling off.

As far as measurement of residual stress in the compound thin films is concerned here, measuring by the method employing x-rays that is illustrated on page 156 of "Foundations of and Applications for PVCD CVD Coatings" (Hyoumen Gijutsu Kyokai, 1994) is possible.

Likewise, although hard carbon thin films, since they are amorphous structure, cannot be evaluated using x-rays, as set forth on page 162 of "Foundations of and Applications for PVCD CVD Coatings" (Hyoumen Gijutsu Kyokai, 1994), inferring the residual stress from the amount of warpage in flat plate test pieces that have been simultaneously coated on one side is possible.

Next, embodiment examples of surface-coated machining tools through this way of embodying the invention will be specifically explained. Nevertheless, how the surface-coated machining tools are coated is not limited to the coating methods utilized herein, and may be by other methods.

FIRST THROUGH THIRTEENTH EMBODIMENT EXAMPLES

Figure 1B:
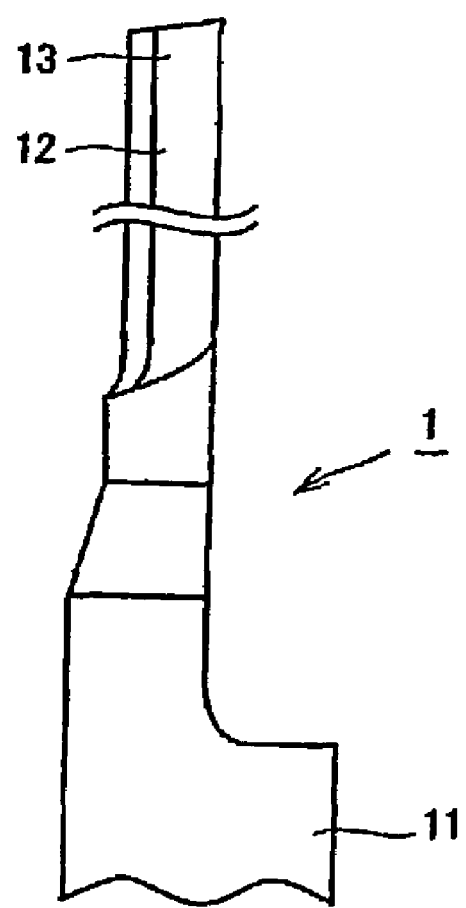
FIG. 1B is an elevational view thereof.

The surface-coated machining tool in these embodiment examples consists of a router cutter for PCB processing, and is depicted in FIGS. 1A and 1B. In the FIG. 1A is a plan view, and 1B is an elevational view.

As shown in FIG. 1, router cutter 1 has a shank 11 that is clamped in a milling machine chuck, and a blade portion 12.

As a base material a router cutter, with a blade-portion 12 diameter of 0.8 mm and a blade length of 6 mm, made of a WC-based cemented carbide containing tungsten carbide and cobalt, with the cobalt inclusion amount being 4 weight % or more and 12 weight % or less, was readied. Using a publicly known arc deposition method employing metal vapor-deposition source raw materials and nitrogen gas and/or methane gas to form a compound thin film 13 onto the surface of the base material, surface-coated router cutters 1 for Embodiment Examples 1 through 12, set forth in Table I, were readied.

Table I.

Likewise, a surface-coated router cutter 1 for Embodiment Example 13 was readied by arc-deposition-forming a hard carbon thin film 13 on the surface of a foregoing WC-based cemented-carbide router cutter 1. In addition, for comparison a non-coated router cutter sample, indicated in Table I, was also readied (Comparative Example 1).

Next, using the above-noted router cutters 1, milling was carried out on a stack of three 1.6-mm thick epoxy-resin boards FR-4 (copper printed on both sides) as a workpiece. The milling conditions therein were made: revolutions, 50,000 rpm; feeding speed, 1.5 m/min; the results of the machining test are shown in Table I.

From the Table I results: As against the non-coated router of Comparative Example 1 break-failing at 2 m, with the router cutters of the present Embodiment Examples 1 through 13, milling for 30 m or more turned out to be possible.

FOURTEENTH THROUGH TWENTY-SIXTH EMBODIMENT EXAMPLES

The surface-coated machining tool in these embodiment examples consists of a miniature-drill for PCB processing.

As a base material a miniature-drill, with a blade-portion diameter of 0.2 mm and a blade length of 6 mm, made of a WC-based cemented carbide was readied, and using a publicly known arc deposition method employing metal vapor-deposition source raw materials and nitrogen gas and/or methane gas to form a compound thin film onto the surface, surface-coated PCB-processing miniature-drills for Embodiment Examples 14 through 25, set forth in Table I, were readied. The film-deposition conditions therein were made: arc current supplied to the vapor-deposition source raw materials, 100 A; base-material bias voltage, 50 V; reaction-gas pressure, 2.7 Pa; and prior to deposition the base-material surface was cleaned with argon-gas plasma.

TABLE I

| Sample | Vapor deposition material | Coating | WC grain size (μm) | Co qty. (wt. %) | Film thickness (μm) | Compressive residual stress (GPa) | Ra (μm) | Milling length (m) |
| --- | --- | --- | --- | --- | --- | --- | --- | --- |
| Embod. Ex. 1 | Ti | TiN | 0.8 | 5 | 1.50 | 1.0 | 0.10 | 40 |
| Embod. Ex. 2 | Ti | TiCN | 1.0 | 4 | 0.30 | 1.1 | 0.05 | 38 |
| Embod. Ex. 3 | TiAl | TiAlN | 0.5 | 8 | 0.80 | 1.7 | 0.21 | 41 |
| Embod. Ex. 4 | TiCr | TiCrN | 1.2 | 8 | 1.70 | 0.9 | 0.14 | 32 |
| Embod. Ex. 5 | TiAlCr | TiAlCrN | 1.3 | 10 | 2.00 | 1.5 | 0.09 | 31 |
| Embod. Ex. 6 | TiSi | TiSiN | 1.5 | 7 | 1.60 | 3.0 | 0.16 | 30 |
| Embod. Ex. 7 | V | VN | 0.9 | 11 | 1.80 | 2.5 | 0.24 | 35 |
| Embod. Ex. 8 | CrSi | CrSiN | 1.4 | 9 | 2.40 | 6.0 | 0.40 | 31 |
| Embod. Ex. 9 | TiAlSi | TiAlSiN | 1.0 | 5 | 3.00 | 4.0 | 0.30 | 33 |
| Embod. Ex. 10 | TiV | TiVN | 1.1 | 12 | 2.50 | 2.0 | 0.15 | 32 |
| Embod. Ex. 11 | CrV | CrVN | 0.7 | 6 | 1.40 | 0.5 | 0.20 | 30 |
| Embod. Ex. 12 | CrAl | CrAlN | 0.2 | 10 | 0.06 | 0.2 | 0.03 | 34 |
| Embod. Ex. 13 | Graphite | Hard carbon film | 0.8 | 5 | 0.10 | 0.8 | 0.02 | 45 |
| Compar. Ex. 1 | None | None | 0.8 | 5 | — | — | 0.02 | 2 |

Table II.

TABLE II

| Sample | Vapor deposition material | Reaction Gas | Coating | WC grain size (μm) | Co qty. (wt. %) | Film thickness (μm) | Compressive residual stress (GPa) | Ra (μm) | Drilling count (holes) |
| --- | --- | --- | --- | --- | --- | --- | --- | --- | --- |
| Embod. Ex. 14 | Ti | Nitrogen | TiN | 0.9 | 6 | 1.60 | 1.5 | 0.15 | 300,000 |
| Embod. Ex. 15 | Ti | Nitrogen + methane | TiCN | 0.8 | 5 | 0.28 | 2.1 | 0.06 | 310,000 |

TABLE II-continued

| Sample | Vapor deposition material | Reaction Gas | Coating | WC grain size (μm) | Co qty. (wt. %) | Film thickness (μm) | Compressive residual stress (GPa) | Ra (μm) | Drilling count (holes) |
|---|---|---|---|---|---|---|---|---|---|
| Embod. Ex. 16 | TiAl | Nitrogen | TiAlN | 0.4 | 12 | 0.85 | 1.4 | 0.22 | 320,000 |
| Embod. Ex. 17 | TiCr | Nitrogen | TiCrN | 1.1 | 8 | 1.90 | 0.8 | 0.16 | 305,000 |
| Embod. Ex. 18 | TiAlCr | Nitrogen + methane | TiAlCrCN | 1.9 | 11 | 2.00 | 1.3 | 0.08 | 310,000 |
| Embod. Ex. 19 | TiSi | Nitrogen | TiSiN | 1.6 | 7 | 1.65 | 3.3 | 0.14 | 400,000 |
| Embod. Ex. 20 | V | Nitrogen | VN | 1.0 | 10 | 1.84 | 2.1 | 0.29 | 320,000 |
| Embod. Ex. 21 | CrSi | Nitrogen | CrSiN | 1.7 | 9 | 2.41 | 7.1 | 0.46 | 310,000 |
| Embod. Ex. 22 | TiAlSi | Nitrogen + methane | TiAlSiCN | 1.0 | 4 | 3.00 | 4.4 | 0.27 | 410,000 |
| Embod. Ex. 23 | TiV | Nitrogen | TiVN | 0.6 | 9 | 2.55 | 2.1 | 0.13 | 320,000 |
| Embod. Ex. 24 | CrV | Nitrogen | CrVN | 0.5 | 8 | 1.58 | 0.4 | 0.25 | 330,000 |
| Embod. Ex. 25 | VSi | Nitrogen | VSiN | 0.2 | 11 | 0.06 | 0.2 | 0.02 | 345,000 |
| Embod. Ex. 26 | Graphite | None | Hard carbon film | 0.7 | 5 | 0.18 | 0.9 | 0.03 | 450,000 |
| Compar. Ex. 2 | None | None | None | 0.8 | 8 | — | — | 0.02 | 50,000 |

Likewise, to prepare Embodiment Example 26, a PCB-processing miniature-drill was surface-coated with a hard carbon thin film formed by arc deposition employing graphite. In addition, for comparison a non-coated PCB-processing miniature-drill, indicated in Table II, was also readied (Comparative Example 1).

Next, using these PCB-processing miniature-drills, drilling was carried out on, as a workpiece, a stack of three 1.6-mm thick epoxy-resin boards FR-4 (copper printed on both sides), onto which 0.15 mm-thick aluminum sheet was stacked as a backing board. The processing conditions therein were made: revolutions, 60,000 rpm; feeding speed, 3 m/min. The results of the machining test are shown in Table II.

From the Table II results: Whereas the non-coated PCB-processing miniature-drill of Comparative Example 2 failed at 50,000 holes due to breakage, with the PCB-processing miniature-drills of the present Embodiment Examples 14 through 26, processing 300,000 or more holes was possible.

Other than machining tools for PCB processing, including the above-described PCB-processing router cutters and drills, machining tools under the present invention may be: other general-application router cutters, drills, end mills, blade-/bit-exchangeable tips for milling and turning, metal saws, gear-cutters, reamers, and taps.

It should be understood that the embodiments disclosed herein are in all respects illustrative, not restrictive. The scope of the present invention is not the explanation set forth above, but is indicated by the scope of the claims; and the inclusion of meanings equivalent to the scope of the claims, and all changes within the scope, is intended.

As explained in the foregoing, in terms of surface-coated machining tools involving the present invention, the fact that blade-portion rigidity is heightened, and that chip-discharging faculty is made better, makes heightened fracturing resistance and durability possible. What is more, striking prolongation of the machining/wear-resistant lifespan, as well as improvement in the processing precision is made possible.

What is claimed is:

1. A router cutter consisting of:
a machining tool shank having a blade portion of 3.175 mm or less diameter, the blade portion fabricated from a cemented-carbide base material containing tungsten carbide and cobalt, with the cobalt inclusion amount being 4 weight % or more and 12 weight % or less; and coated to a given thickness in a single layer over said cemented-carbide base material, a compound thin film made up of a combination of, in given elemental proportions, one or more elements selected from the group, chromium, vanadium, silicon and aluminum, and one or more elements selected from carbon and nitrogen; wherein
said compound thin film is vapor-deposited onto said base material under reaction-gas pressure, base-material bias voltage, and deposition-temperature conditions that, together with said given thickness and said given elemental proportions, are predetermined so as to impart a compressive residual stress of 0.1 GPa or more and 8 GPa or less to said compound thin film,
said compound thin film has a surface roughness of 0.01 μm or more and less than 0.3 μm by indication Ra, and
said predetermined thickness of said compound thin film is 0.05 μm or more and less than 1.5 μm.

2. The surface-coated machining tool set forth in claim 1, wherein the tungsten carbide in said cemented-carbide base material is 0.1 μm or more and 1.5 μm or less in pre-sintering crystal-grain size.

3. A router cutter according to claim 1, wherein said blade portion is approximately 6 mm in length.

4. A miniature drill for processing printed circuit boards, the miniature drill consisting of:
a machining tool shank having a blade portion of 3.175 mm or less diameter, the blade portion fabricated from a cemented-carbide base material containing tungsten carbide and cobalt, with the cobalt inclusion amount being 4 weight % or more and 12 weight % or less; and coated to a given thickness in a single layer over said cemented-carbide base material, a compound thin film made up of a combination of, in given elemental proportions, one or more elements selected from the group, chromium, vanadium, silicon and aluminum, and one or more elements selected from carbon and nitrogen; wherein
said compound thin film is vapor-deposited onto said base material under reaction-gas pressure, base-material bias voltage, and deposition-temperature conditions that, together with said given thickness and said given elemental proportions, are predetermined so as to impart a compressive residual stress of 0.1 GPa or more and 8 GPa or less to said compound thin film, said compound thin film has a surface roughness of 0.01 μm or more and less than 0.3 μm by indication Ra, and said predetermined thickness of said compound thin film is 0.05 μm or more and less than 1.5 μm.

5. A miniature drill according to claim 4, wherein said blade portion is approximately 6 mm in length.

6. A router cutter comprising:
a cemented-carbide base material of 3.175 mm or less blade-portion diameter and containing tungsten carbide and cobalt, the cemented-carbide base material having a bulk cobalt concentration of 4 weight % or more and 12 weight % or less, the cemented-carbide base material including a cutting surface;
a hard carbon thin film made up essentially of carbon atoms only, coated to a thickness in the range of 0.05 to 0.2 μm over the cutting surface of said cemented- carbide base material by a physical vapor deposition method in which graphite is made a raw material, and under reaction-gas pressure, base-material bias voltage, and deposition-temperature conditions that, together with said given thickness, are predetermined so as to impart a compressive residual stress of 0.1 GPa or more and 1 GPa or less to said compound thin film; wherein
the hard carbon thin film consists of a single layer deposited on the cemented-carbide base material such that substantially the entire hard carbon thin film is in direct contact with the cemented-carbide base material, and
the hard carbon thin film is surface roughness adjusted to be 0.01 μm or more and 0.5 μm or less by indication Ra.

7. The surface-coated machining tool set forth in claim 6, wherein the tungsten carbide in said cemented-carbide base material is 0.1 μm or more and 1.5 μm or less in pre-sintering crystal-grain size.

8. A router cutter according to claim 6, wherein said blade portion is approximately 6 mm in length.

9. A miniature drill for processing printed circuit boards, the miniature drill comprising:
a cemented-carbide base material of 0.3 mm or less blade-portion diameter and containing tungsten carbide and cobalt, the cemented-carbide base material having a bulk cobalt concentration of 4 weight % or more and 12 weight % or less, the cemented-carbide base material including a cutting surface;
a hard carbon thin film made up essentially of carbon atoms only, coated to a thickness in the range of 0.05 to 0.2 μm over the cutting surface of said cemented- carbide base material, by a cathodic-arc deposition method in which graphite is made a raw material, and under reaction-gas pressure, base-material bias voltage, and deposition-temperature conditions that, together with said given thickness, are predetermined so as to impart a compressive residual stress of 0.1 GPa or more and 1 GPa or less is imparted to said hard carbon thin film; wherein
the hard carbon thin film consists of a single layer deposited on the cemented-carbide base material such that substantially the entire hard carbon thin film is in direct contact with the cemented-carbide base material, and
the hard carbon thin film is surface roughness adjusted to be 0.01 μm or more and 0.5 μm or less by indication Ra.

10. A miniature drill according to claim 9, wherein said blade portion is approximately 6 mm in length.

* * * * *